UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

AZO DYE.

999,230.  Specification of Letters Patent.  Patented Aug. 1, 1911.

No Drawing.  Application filed December 10, 1910. Serial No. 596,599.

*To all whom it may concern:*

Be it known that I, GEORG KALISCHER, doctor of philosophy, a subject of the Kingdom of Prussia, and a resident of Wolfsgangstrasse 123, Frankfort-on-the-Main, Germany, have invented certain new and useful Improvements in the Manufacture of Azo Dyes, of which the following is a full description.

My invention has for its object the manufacture of new azo dyestuffs by means of the m-aminophenylnaphtimidazole.3.oxy.6.-sulfonic acid of the formula

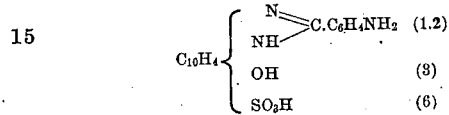

This hitherto unknown compound may be obtained by condensing with aminobenzaldehydebisulfite 1.2.diamino.3.naphthol.6.sulfonic acid. The new acid is difficultly soluble in water, and its sodium salt crystallizes well and is somewhat difficultly soluble in cold water.

The dyestuffs prepared by combining one molecule of the new acid with one molecule of an aromatic diazo compound have a remarkable affinity for vegetable fiber, and dye cotton directly yellow to red shades. The dyeings thus obtained may by diazotizing and developing with beta naphthol be transformed into orange to red shades of very good fastness to washing.

If the diazotizing be carried out in substance and the diazo compound be combined with suitable azo components, dyestuffs of similar shades are obtained which possess a good fastness to acids and an excellent affinity for cotton fiber. If the last component is a compound which also introduces into the dyestuff another diazotizable amino-group, the dyestuffs produced by means of the latter may again be diazotized and developed on the fiber, which very considerably enhances the intensity and fastness to washing.

The process is illustrated by the following examples:—

Example 1: 9.3 kilos anilin are transformed into the diazo compound which is introduced into the solution of 38 kilos m-aminophenyl.1.2.naphtimidazole.3.oxy.6.-sulfonate of sodium and an excess of carbonate of soda. Coupling being complete, the whole is heated and salted out. The dry coloring matter is a red powder which dissolves in water with an orange-yellow color and in concentrated sulfuric acid with a scarlet red color. It dyes cotton orange-yellow shades, which on being developed with beta naphthol turn orange and become fast to washing. If the anilin is replaced by another diazo compound, dyestuffs of similar qualities are obtained, *e. g.* azoxyanilin (dyes orange), aminoazobenzene sulfonic acid (dyes bluish red).

Example 2: 48.1 kilos of the dyestuff of Example 1 (from anilin) are finely suspended in water of about 0° C. 36 kilos hydrochloric acid are first added and then gradually 7 kilos nitrite. After stirring for several hours, the diazo compound is introduced into a solution of 24.6 kilos 2:6 naphtholsulfonate of soda and an excess of carbonate of soda. The dyestuff is isolated in the usual manner. It dissolves in water with an orange, and in concentrated sulfuric acid with a scarlet, color. Cotton is dyed in bright orange shades. Such dyeings are fast to acids. If instead of the 2.6 naphtholsulfonate of soda 38 kilos m-aminophenyl.1.-2.naphtimidazole.5.oxy.7.sulfonate of soda be used, a dyestuff results which dyes cotton a yellowish red shade; when developed with beta naphthol, the dyeings become more intense and completely fast to washing.

Having now particularly described and ascertained the nature of my said invention, and in what manner the same is to be performed, I declare that what I claim is:—

1. The manufacture of azo dyes by combining one molecular proportion of an aromatic compound with one molecular proportion of the m-aminophenyl.1.2.naphtimidazole.3.oxy.6.sulfonic acid, the dyestuffs thus obtained being suitable to be diazotized and combined with an azo compound, substantially as described.

2. The new dyestuffs of the general formula

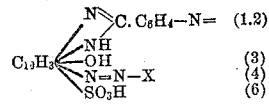

(in which X means an aromatic radical) which in the dry state form red powders, dissolving in concentrated sulfuric acid with a red color and dyeing mordanted cotton in yellow to red shades fast to acids, substantially as described.

3. The new dyestuff obtained by combining in alkaline solution the diazo compound of anilin with one molecular proportion of the m-aminophenyl.1.2.naphtimidazole.3.oxy.6.sulfonic acid, the dyestuff thus produced being in the dry state a red powder, dissolving in concentrated sulfonic acid with a scarlet red color dyeing cotton orange-yellow shades, which on being developed with beta naphthol turn orange, substantially as described.

In witness whereof I have hereunto signed my name this 25th day of November 1910, in the presence of two subscribing witnesses.

GEORG KALISCHER.

Witnesses:
JEAN GRUND,
CARL GRUND.